(12) United States Patent
Zhao et al.

(10) Patent No.: US 10,931,001 B2
(45) Date of Patent: Feb. 23, 2021

(54) ELECTRONIC APPARATUS AND SMARTPHONE

(71) Applicant: GUANGDONG OPPO MOBILE TELECOMMUNICATIONS CORP., LTD., Guangdong (CN)

(72) Inventors: Ning Zhao, Dongguan (CN); Tianping Liang, Dongguan (CN); Yantao Li, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/387,067

(22) Filed: Apr. 17, 2019

(65) Prior Publication Data

US 2019/0334226 A1    Oct. 31, 2019

(30) Foreign Application Priority Data

Apr. 28, 2018 (CN) .......................... 2018 1 0402824

(51) Int. Cl.
*H01Q 1/24* (2006.01)
*H01Q 5/307* (2015.01)
(Continued)

(52) U.S. Cl.
CPC ............. *H01Q 1/244* (2013.01); *H01Q 5/307* (2015.01); *H04B 7/0404* (2013.01);
(Continued)

(58) Field of Classification Search
CPC ........... H01Q 1/10; H01Q 1/22; H01Q 1/243; H01Q 1/244; H01Q 5/307; H01Q 21/28;
(Continued)

(56) References Cited

U.S. PATENT DOCUMENTS

| 8,477,074 B2 | 7/2013 | Fukuchi |
| 2007/0035454 A1* | 2/2007 | Zarnowitz .............. H01Q 1/244 343/702 |

(Continued)

FOREIGN PATENT DOCUMENTS

| CN | 2465338 Y | 12/2001 |
| CN | 2874800 Y | 2/2007 |

(Continued)

OTHER PUBLICATIONS

International search report in the international application No. PCT/CN2019/084271, dated Jun. 28, 2019 (4 pages).

(Continued)

*Primary Examiner* — Seokjin Kim
(74) *Attorney, Agent, or Firm* — Ladas & Parry, LLP

(57) ABSTRACT

The present disclosure provides an electronic apparatus including a main body, a sliding seat, a middle frame and four first antenna radiators. The main body may have a receiving space defined therein. An opening may be formed in the main body to communicate with the receiving space such that the receiving space can be communicated outside via the opening. The sliding seat may be received in the receiving space and movably connected to the main body such that the sliding seat can have a capability of being moved out from or retracted into the receiving space via the opening. The middle frame may be received in the receiving space. Four first antenna radiators may be disposed on the middle frame and the sliding seat respectively. The four first antenna radiators may have a capability of operating at a first frequency band.

19 Claims, 7 Drawing Sheets

(51) Int. Cl.
*H04B 7/0404* (2017.01)
*H04B 7/0413* (2017.01)
*H04M 1/02* (2006.01)

(52) U.S. Cl.
CPC ........ *H04B 7/0413* (2013.01); *H04M 1/0235* (2013.01); *H04M 1/0262* (2013.01); *H04M 1/0266* (2013.01)

(58) Field of Classification Search
CPC ............ H04B 7/0404; H04B 7/10413; H04M 1/0235; H04M 1/0262; H04M 1/0266
See application file for complete search history.

(56) References Cited

U.S. PATENT DOCUMENTS

| | | | |
|---|---|---|---|
| 2007/0285320 A1* | 12/2007 | Hayes | G06K 19/07749 343/702 |
| 2009/0121963 A1* | 5/2009 | Greene | H03H 7/40 343/861 |
| 2011/0187612 A1 | 8/2011 | Fukuchi | |
| 2013/0016028 A1* | 1/2013 | Joo | H01Q 1/244 343/883 |
| 2015/0380825 A1 | 12/2015 | Ryu et al. | |
| 2020/0058992 A1* | 2/2020 | Wu | H01Q 1/521 |

FOREIGN PATENT DOCUMENTS

| | | |
|---|---|---|
| CN | 1913227 A | 9/2008 |
| CN | 201112548 Y | 9/2008 |
| CN | 201270278 Y | 7/2009 |
| CN | 201656977 U | 11/2010 |
| CN | 201876905 U | 6/2011 |
| CN | 102118464 A | 7/2011 |
| CN | 102842751 A | 12/2012 |
| CN | 205375019 U | 7/2016 |
| CN | 205406708 U | 7/2016 |
| CN | 106505298 A | 3/2017 |
| KR | 20060036015 A | 4/2006 |
| WO | 2013103564 A1 | 7/2013 |
| WO | 2015046380 A1 | 4/2015 |

OTHER PUBLICATIONS

European search report in the application No. EP19169861, dated Sep. 4, 2019 (17 pages).
First Office Action from China patent office in a counterpart Chinese patent Application 201810402824.X, dated Mar. 24, 2020 (24 pages).
Second Office Action from China patent office in a counterpart Chinese patent Application 201810402824.X, dated Sep. 16, 2020 (23 pages).
First Examination Report from India patent office in a counterpart Indian patent Application 201914016010, dated Nov. 25, 2020 (5 pages).

* cited by examiner

ELECTRONIC APPARATUS AND SMARTPHONE

CROSS REFERENCE TO RELATED APPLICATION

This application claims foreign priorities of Chinese Patent Application No. 201810402824.X, filed on Apr. 28, 2018, the entire contents of which are hereby incorporated by reference in their entireties.

TECHNICAL FIELD

The described embodiments relate to electronic technology, and in particular to an electronic apparatus and a smartphone.

BACKGROUND

Antenna is a convertor, which can convert guided wave transmitted on transmission line to electromagnetic wave transmitted on unbounded medium (generally free space), or convert electromagnetic wave transmitted on unbounded medium to guided wave transmitted on transmission line. Electronic apparatus such as mobile phone usually include antenna to achieve communication function. However, along with the recent trend towards thinness on the electronic apparatus, such as mobile phone, receiving space in the electronic apparatus is smaller and smaller, causing clearance area in the electronic apparatus narrower and narrower, which results in a poor communication effect.

SUMMARY

The present disclosure provides an electronic apparatus including a main body, a middle frame, a sliding seat and four first antenna radiators. The main body may have a receiving space defined therein. An opening may be formed in the main body to communicate with the receiving space such that the receiving space can be communicated outside via the opening. The sliding seat may be received in the receiving space and movably connected to the main body such that the sliding seat may have a capability of being moved out from or retracted into the receiving space via the opening. The middle frame may be received in the receiving space. Four first antenna radiators may be disposed on the middle frame and the sliding seat respectively. The four first antenna radiators may have a capability of operating at a first frequency band.

The present disclosure further provides an electronic apparatus including a housing, a sliding seat and a plurality of antenna radiators. The housing may have a receiving space defined therein. Wherein an opening may be formed in the housing to communicate with the receiving space such that the receiving space can be communicated outside via the opening. The sliding seat may be received in the receiving space, and movably connected to the housing such that the sliding seat can have a capability of being moved out from or retracted into the receiving space via the opening. A plurality of antenna radiators may be disposed on the sliding seat and configured to be moved out from or retracted into the receiving space along with the sliding seat.

The present disclosure further provides a smartphone including a housing, a sliding seat and a plurality of antenna radiators. The housing may have a receiving space defined therein. Wherein an opening may be formed in the housing to communicate with the receiving space such that the receiving space can be communicated outside via the opening. The housing may include a display screen, a bezel, and a cover plate. The cover plate may be fixed to the bezel. The display screen and the cover plate may be arranged on two opposite sides of the bezel respectively. The receiving space may be defined by the cover plate, the bezel and the display screen. The opening may be formed in the bezel. The sliding seat may be received in the receiving space and movably connected to the housing such that the sliding seat can have a capability of being moved out from or retracted into the receiving space via the opening. Wherein a plurality of antenna radiators may be disposed on the sliding seat and configured to be moved out from or retracted into the receiving space along with the sliding seat.

BRIEF DESCRIPTION OF THE DRAWINGS

Accompanying drawings are for providing further understanding of embodiments of the present disclosure. The drawings form a part of the disclosure and are for illustrating the principle of the embodiments of the present disclosure along with the literal description. Apparently, the drawings in the description below are merely some embodiments of the present disclosure, a person skilled in the art can obtain other drawings according to these drawings without creative efforts.

DETAILED DESCRIPTION

Figure 1:
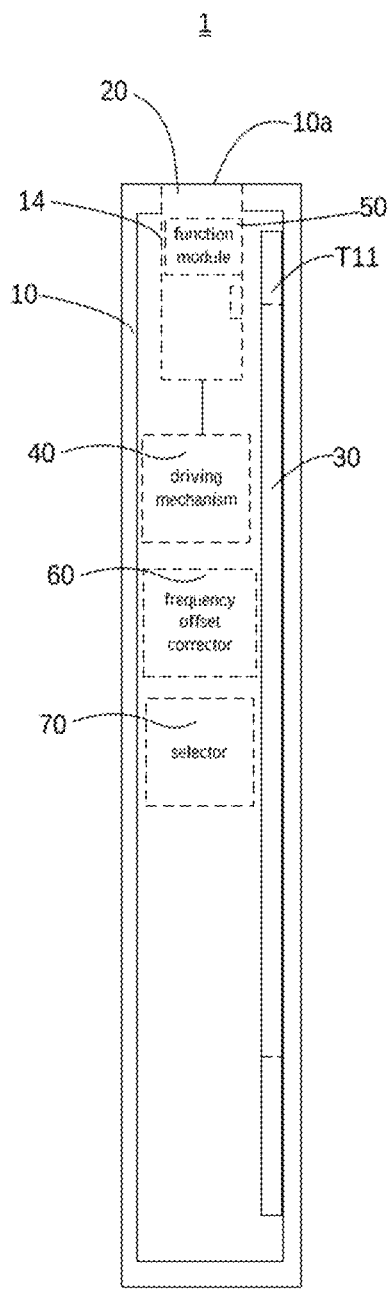
FIG. 1 is a schematic view of a sliding seat received in a receiving space of an electronic apparatus according to a first embodiment of the present disclosure.

In order to be more clearly understood, the above objects, features and advantages of the present disclosure will be described with reference to drawings and embodiments in detail hereinbelow. Note that combination of different embodiments and features are allowable as long as they do not conflict to each other.

An electronic apparatus according to an embodiment of the present disclosure may include a main body, a middle frame, a sliding seat and four first antenna radiators. The main body may have a receiving space defined therein. An opening may be formed in the main body to communicate with the receiving space such that the receiving space can be communicated outside via the opening. The sliding seat may be received in the receiving space and movably connected to the main body such that the sliding seat may have a capability of being moved out from or retracted into the receiving space via the opening. The middle frame may be received in the receiving space. Four first antenna radiators may be disposed on the middle frame and the sliding seat respectively. The four first antenna radiators may have a capability of operating at a first frequency band.

In another embodiment, the middle frame may include a first portion and a second portion. The first portion and the second portion may be arranged to be opposite to each other. The first portion may be located closer to the opening than the second portion. One of the four first antenna radiators may be disposed on the sliding seat. Another one of the four first antenna radiators may be disposed on the first portion. Another two of the four first antenna radiators may be disposed on the second portion.

In another embodiment, two first antenna radiators of the four first antenna radiators may further have a capability of operating at a second frequency band.

In further another embodiment, one of the two first antenna radiators further having a capability of operating at the second frequency band may be disposed on the first portion. The other one of the two first antenna radiators may be disposed on the second portion.

In still further another embodiment, the four first antenna radiators may form a 4*4 MIMO LTE antenna array. The first frequency band may be an intermediate frequency band and a high frequency band of LTE frequency band. The intermediate frequency band of the LTE frequency band may be in a range of 1710 MHZ~2170 MHZ. The high frequency band of the LTE frequency band may be in a range of 2300 MHZ~2400 MHZ and 2500 MHZ~2700 MHZ.

In one embodiment, the second frequency band may include a low frequency band of LTE frequency band. The low frequency band of the LTE frequency band may be in a range of 824 MHz~960 MHz.

In another embodiment, the electronic apparatus may further include at least two second antenna radiators disposed on the middle frame. The at least two second antenna radiators may have a capability of operating at a third frequency band.

In another embodiment, the middle frame may include a first portion and a second portion. The first portion and the second portion may be arranged to be opposite to each other. The first portion may be located closer to the opening than the second portion. The at least two second antenna radiators may be disposed on the first portion.

In another embodiment, the third frequency band may be a 5 G Wi-Fi frequency band. The at least two second antenna radiators may form a 2*2 MIMO 5 G Wi-Fi antenna array.

In further another embodiment, the middle frame may be made of metal. Each first antenna radiator disposed on the middle frame may be an independent metal area of the middle frame separated by a slot band.

In further another embodiment, one second antenna radiator disposed on the middle frame may be an independent metal area of the middle frame separated by a slot band. Another second antenna radiator disposed on the middle frame may be a FPC antenna fixed on the middle frame.

In still further another embodiment, the electronic apparatus may further include a third antenna radiator disposed on the sliding seat. The third antenna radiator may have a capability of operating at a fourth frequency band. The fourth frequency band may include a 2.4 G Wi-Fi frequency band.

In one embodiment, the sliding seat may be made of an insulating material. The first antenna radiator and the third antenna radiator disposed on the sliding seat may be FPC antennas fixed on the sliding seat, or LDS antennas formed on the sliding seat by laser engraving, or PDS antennas formed on the sliding seat by printing.

In another embodiment, the sliding seat may be made of metal. Each of the first antenna radiator and the third antenna radiator disposed on the sliding seat may be an independent metal area of the sliding seat separated by slot bands.

In another embodiment, the main body may include a display screen and a battery cover. The battery cover may include a bezel and a cover plate. The cover plate may be fixed to the bezel. The display screen and the cover plate may be arranged on two opposite sides of the bezel respectively. The receiving space may be defined by the cover plate, the bezel and the display screen. The opening may be formed in the bezel.

In further another embodiment, the opening may be formed in the bezel and further pass through a part of the cover plate.

In further another embodiment, the electronic apparatus may further include a driving mechanism to drive the sliding seat to be moved out from or retracted into the receiving space.

In further another embodiment, the electronic apparatus may further include at least one function module. The function module may be selected from a group including a camera module, a flash lamp module, a position sensor module and a receiver module. The function module may be mounted on the sliding seat.

In still further another embodiment, the electronic apparatus may further include an frequency offset corrector. The frequency offset corrector may be configured to correct a frequency offset of any antenna radiator near the sliding seat caused by a position change of the sliding seat relative to the main body.

In one embodiment, the electronic apparatus may further include a selector. The selector may be configured to select a first antenna radiator disposed on the middle frame or a first antenna radiator disposed on the sliding seat to work, when the sliding seat is received in the receiving space.

An electronic apparatus according to an embodiment of the present disclosure may include a housing, a sliding seat and a plurality of antenna radiators. The housing may have a receiving space defined therein. Wherein an opening may be formed in the housing to communicate with the receiving space such that the receiving space can be communicated outside via the opening. The sliding seat may be received in the receiving space, and movably connected to the housing such that the sliding seat can have a capability of being moved out from or retracted into the receiving space via the opening. A plurality of antenna radiators may be disposed on the sliding seat and configured to be moved out from or retracted into the receiving space along with the sliding seat.

A smartphone according to an embodiment of the present disclosure may include a housing, a sliding seat and a plurality of antenna radiators. The housing may have a receiving space defined therein. Wherein an opening may be formed in the housing to communicate with the receiving space such that the receiving space can be communicated outside via the opening. The housing may include a display screen, a bezel, and a cover plate. The cover plate may be fixed to the bezel. The display screen and the cover plate may be arranged on two opposite sides of the bezel respectively. The receiving space may be defined by the cover plate, the bezel and the display screen. The opening may be formed in the bezel. The sliding seat may be received in the receiving space and movably connected to the housing such that the sliding seat can have a capability of being moved out from or retracted into the receiving space via the opening.

Wherein a plurality of antenna radiators may be disposed on the sliding seat and configured to be moved out from or retracted into the receiving space along with the sliding seat.

Figure 2:
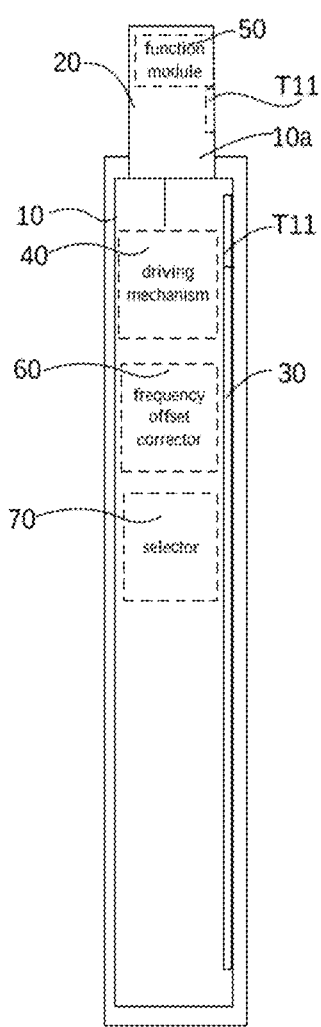
FIG. 2 is a schematic view of a sliding seat moving out of a receiving space of an electronic apparatus according to a first embodiment of the present disclosure.
Figure 3:
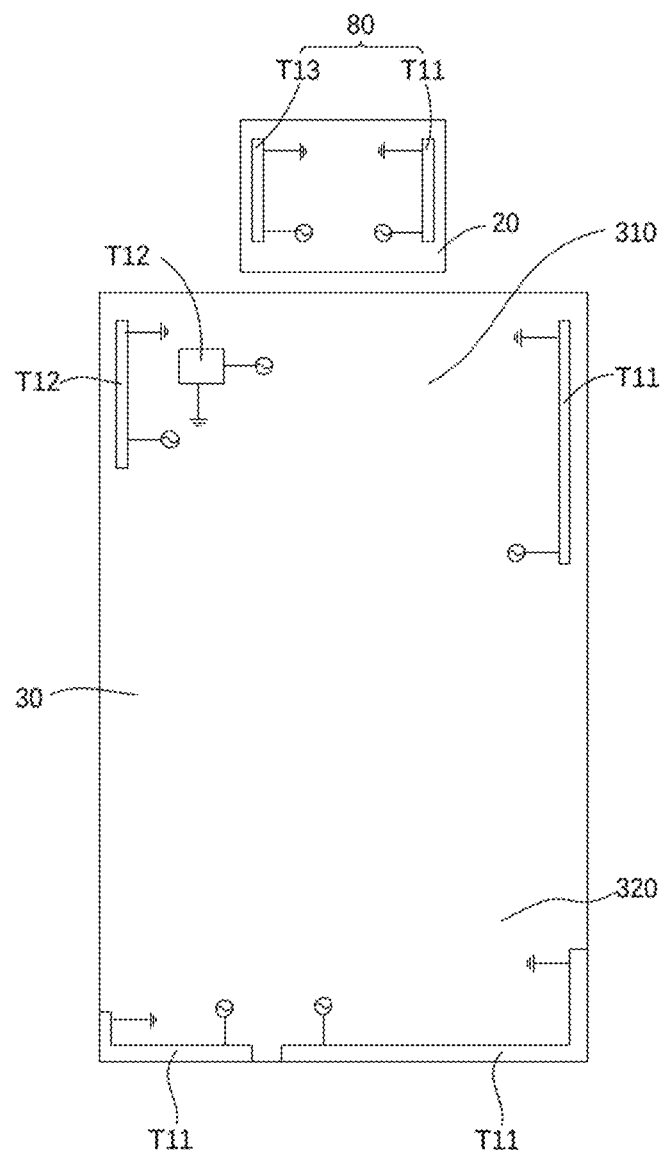
FIG. 3 is a schematic view of a sliding seat moved out from a receiving space and a middle frame of an electronic apparatus according to a first embodiment of the present disclosure.

Please refer to FIG. 1, FIG. 2 and FIG. 3, FIG. 1 is a schematic view of a sliding seat received in a receiving space of an electronic apparatus according to a first embodiment of the present disclosure. FIG. 2 is a schematic view of a sliding seat moving out of a receiving space of an electronic apparatus according to a first embodiment of the present disclosure. FIG. 3 is a schematic view of a sliding seat moved out from a receiving space and a middle frame of an electronic apparatus according to a first embodiment of the present disclosure. The electronic apparatus may include but not limited to smartphone, mobile internet device (MID), electronic book, Play Station Portable (PSP) and Personal Digital Assistant (PDA) or other communication devices.

The electronic apparatus 1 may include a main body 10, a sliding seat 20 a middle frame 30 and four first antenna radiators T11. The main body 10 may have a receiving space 14 defined therein. An opening 10a may be formed on the main body 10 to communicate with the receiving space 14 such that the receiving space 14 may be communicated outside via the opening 10a. The sliding seat 20 may be received in the receiving space 14 and movably connected to the main body 10 through the opening 10a such that the sliding seat 20 may have a capability of being moved out from or retracted into the receiving space 14 via the opening 10a. The middle frame 30 may be received in the receiving space 14. Four first antenna radiators T11 may be disposed on the middle frame 30 and the sliding seat 20. The four first antenna radiators T11 can have a capability of operating at a first frequency band.

Compared to related art, in the electronic apparatus 1 of the present disclosure, four first antenna radiators T11 may be disposed on the middle frame 30 and the sliding seat 20. The four first antenna radiators T11 can form a 4*4 MIMO antenna array to greatly improve the performance of the antenna. What's more, since part of the four first antenna radiators T11 may be disposed on the sliding seat 20, when the sliding seat 20 is moved out from the main body 10, the part of the four first antenna radiators T11 can be away from the main body 10 to effectively enlarge the clearance area of the part of the four first antenna radiators T11, from which the performance of the antenna and the communication effect of the electronic apparatus 1 can be improved.

Further, the middle frame 30 may include a first portion 310 and a second portion 320. The first portion 310 and the second portion 320 may be arranged to be opposite to each other. The first portion 310 may be located closer to the opening 10a than the second portion 320. One of the four first antenna radiators T11 may be disposed on the sliding seat 20. Another of the four first antenna radiators T11 may be disposed on the first portion 310. And other two of the four first antenna radiators T11 may be disposed on the second portion 320.

Further, two first antenna radiators T11 of the four first antenna radiators T11 may further have a capability of operating at a second frequency band.

Further, one of the two first antenna radiators T11 further having a capability of operating at the second frequency band may be disposed on the first portion 310, the other one of the two first antenna radiators T11 may be disposed on the second portion 320.

Further, the four first antenna radiators T11 may form a 4*4 Multiple Input and Multiple Output (MIMO) Long Term Evolution (LTE; the 4 generation communication network system) antenna array. The first frequency band may include an intermediate frequency band and a high frequency band of LTE frequency band. The intermediate frequency band of LTE frequency band can be in a range of 1710 MHz~2170 MHz, and the high frequency band of LTE frequency band can be in a range of 2300 MHz~2400 MHz and 2500 MHz~2700 MHz. The second frequency band may include a low frequency band of LTE frequency band. Wherein the low frequency band of LTE frequency band can be in a range of 824 MHz~960 MHz.

Furthermore, the electronic apparatus may further include at least two second antenna radiators T12 disposed on the middle frame 30. The at least two second antenna radiators T12 can have a capability of operating at a third frequency band. The at least two second antenna radiators T12 may be disposed on the first portion 320. The third frequency band may be a 5 G Wi-Fi frequency band. The at least two second antenna radiators T12 can form a 2*2 MIMO 5 G Wi-Fi antenna array. A range of the 5 G Wi-Fi frequency band may generally be 5.1 GHz~5.8 GHz.

The electronic apparatus 1 may further include a third antenna radiator T13 disposed on the sliding seat 20. The third antenna radiator T13 can have a capability of operating at a fourth frequency band. The fourth frequency band may include a 2.4 G Wi-Fi frequency band. The 2.4 G Wi-Fi frequency band may generally be in a range of 2.4 GHz~2.5 GHz.

In the present embodiment, the sliding seat 20 may be made of a metal material. Each of the first antenna radiator T11 and the third antenna radiator T13 disposed on the sliding seat 20 may be an independent metal area of the sliding seat 20 separated by slot bands.

The middle frame 30 may be made of a metal material. Each first antenna radiator T11 disposed on the middle frame 30 may be an independent metal area of the middle frame 30 separated by a slot band.

One second antenna radiator T12 disposed on the middle frame 30 may be an independent metal area of the middle frame 30 separated by a slot band. Another second antenna radiator T12 disposed on the middle frame 30 may be a FPC antenna fixed on the middle frame 30.

In other embodiments, the sliding seat 20 can be made of an insulating material. The first antenna radiator T11 and the third antenna radiator T13 disposed on the sliding seat 20 may be FPC antennas fixed on the sliding seat 20, or LDS antennas respectively formed on the sliding seat 20 by laser engraving, or PDS antennas formed on the sliding seat 20 by printing.

Figure 4:
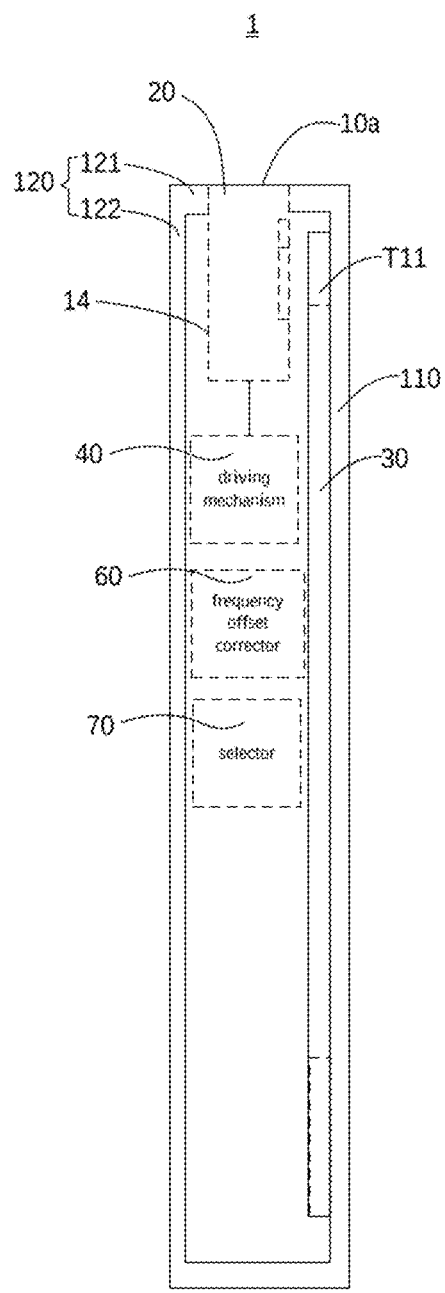
FIG. 4 is a schematic diagram of an electronic apparatus according to a second embodiment of the present disclosure.

Hereinbelow, an electronic apparatus 1 of a second embodiment according to the present disclosure will be described with reference to the electronic apparatus 1 of the first embodiment described above. Please refer to FIG. 4, FIG. 4 is a schematic diagram of an electronic apparatus 1 according to the second embodiment of the present disclosure. In this embodiment, the main body 10 may include a display screen 110 and a battery cover 120. The battery cover 120 may include a bezel 121 and a cover plate 122 fixed to the bezel 121. The display screen 110 and the cover plate 122 may be arranged on two opposite sides of the bezel 121 respectively. The receiving space 14 can be defined by the cover plate 122, the bezel 121 and the display screen 110. The opening 10a may be formed in the bezel 121.

The display screen 110 can be a liquid crystal display panel, an organic light emitting diode display panel and so on. The display screen 110 may be either a display panel with a single display function or a display panel integrating a touch screen function.

Figure 5:
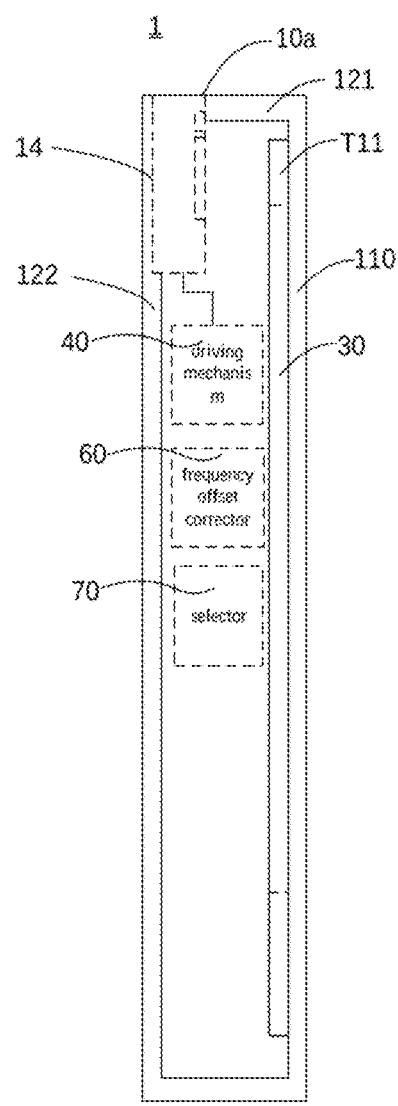
FIG. 5 is a schematic diagram of an electronic apparatus according to a third embodiment of the present disclosure.

Hereinbelow, an electronic apparatus 1 of a third embodiment according to the present disclosure will be described with reference to the electronic apparatus 1 of the first embodiment described above. Please refer to FIG. 5, FIG. 5 is a schematic diagram of an electronic apparatus according to a third embodiment of the present disclosure. In this embodiment, the main body 10 may include a display screen 110 and a battery cover 120. The battery cover 120 may include a bezel 121 and a cover plate 122 fixed to the bezel 121. The display screen 110 and the cover plate 122 may be arranged on two opposite sides of the bezel 121 respectively. The receiving space 14 can be defined by the cover plate 122, the bezel 121 and the display screen 110. The opening 10a may be defined on the bezel 121 and pass through a part of the cover plate 122.

In one embodiment with reference to the electronic apparatus 1 according to any embodiment described above, the electronic apparatus 1 may further include a driving mechanism 40. The sliding seat 20 can be moved out from or retracted into the receiving space 14 by the driving mechanism 40. Specifically, the driving mechanism 40 may be connected to one end of the sliding seat 20. The driving mechanism 40 can send out a driving signal, drove by which the sliding seat 20 can be moved out from or retracted into the receiving space 14. The driving mechanism 40 may be a driving motor, or can also undergo an enlongation or a contraction through a gear and rack. The driving mechanism 40 may also be made of electrostrictive material. When the driving mechanism 40 loads a first electrical signal, the electrostrictive material can elongate to drive the sliding seat 20 to be moved out from the receiving space 14. When the driving mechanism 40 loads a second electrical signal, the electrostrictive material can contract to drive the sliding seat 20 to be retracted into the receiving space 14. A polarity of the first electrical signal may be different from that of the second electrical signal.

It will be understood that, in other embodiment, the driving mechanism 40 may be made of magnetostrictive material. And the driving mechanism 40 may include a drive lever and a coil wound around an outer peripheral surface of the drive lever. When the coil loads a third electrical signal, it may generate a first electromagnetic wave signal. Under an effect of the first electromagnetic wave signal, the drive lever can elongate to drive the sliding seat 20 to be moved out from the receiving space 14. When the coil loads a fourth electrical signal, it may generate a second electromagnetic wave signal. Under an effect of the second electromagnetic wave signal, the drive lever can contract to drive the sliding seat 20 to be retracted into the receiving space 14. When a winding direction of the coil wound around the outer peripheral surface of the drive lever remains unchanged, a flow direction of the third electrical signal is different from that of the fourth electrical signal.

In one embodiment with reference to the electronic apparatus 1 according to any embodiment described above, the electronic apparatus 1 may further include at least one function module 50 mounted on the sliding seat. The function module 50 may be selected from a group including a camera module, a flash lamp module, a position sensor module and a receiver module. Since the function module 50 can be mounted on the sliding seat 20 to be moved out from the receiving space 14 along with the sliding seat 20, there is no need to define a corresponding hole to receive the function module 50 on a non-display area of the display screen 110, which can improve a proportion of a display area, in favor of achieving a full screen of the electronic apparatus 1.

In one embodiment with reference to the electronic apparatus 1 according to any embodiment described above, the electronic apparatus 1 may further include an frequency offset corrector 60 configured to correct a frequency offset of any antenna radiator near the sliding seat 20 caused by a position change of the sliding seat 20 relative to the main body 10.

In one embodiment with reference to the electronic apparatus 1 according to any embodiment described above, the electronic apparatus 1 may further include a selector 70. The selector 70 may be configured to select a first antenna radiator T11 disposed on the middle frame 30 or a first antenna radiator T11 disposed on the sliding seat 20 to work, when the sliding seat 20 is received in the receiving space 14.

Figure 6:
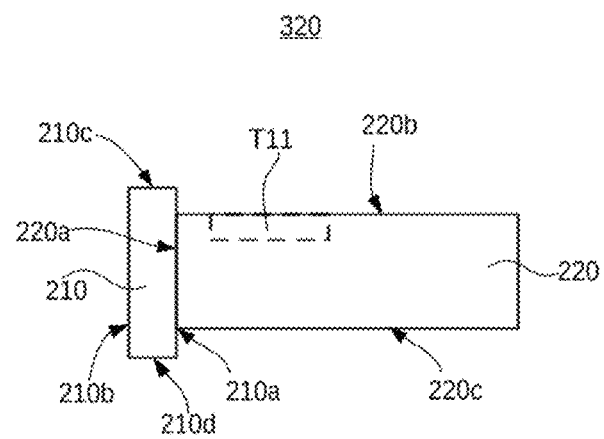
FIG. 6 is a schematic diagram of the sliding seat of an electronic apparatus according to a fourth embodiment of the present disclosure.
Figure 7:
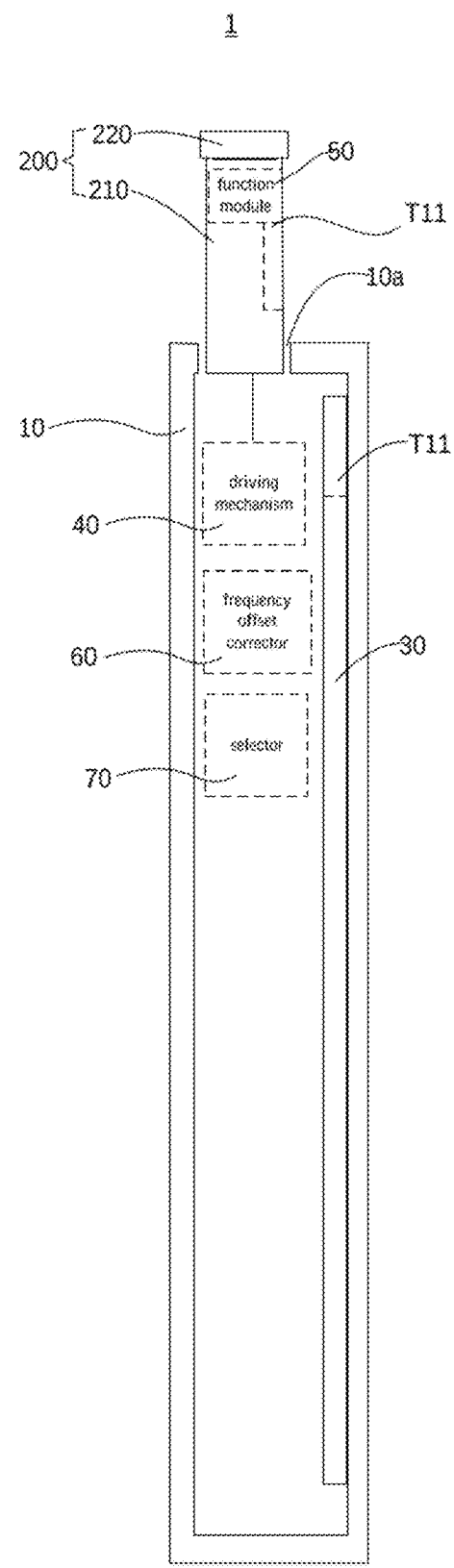
FIG. 7 is a schematic diagram of the sliding seat provided by FIG. 4 moving out of the receiving space.
Figure 8:
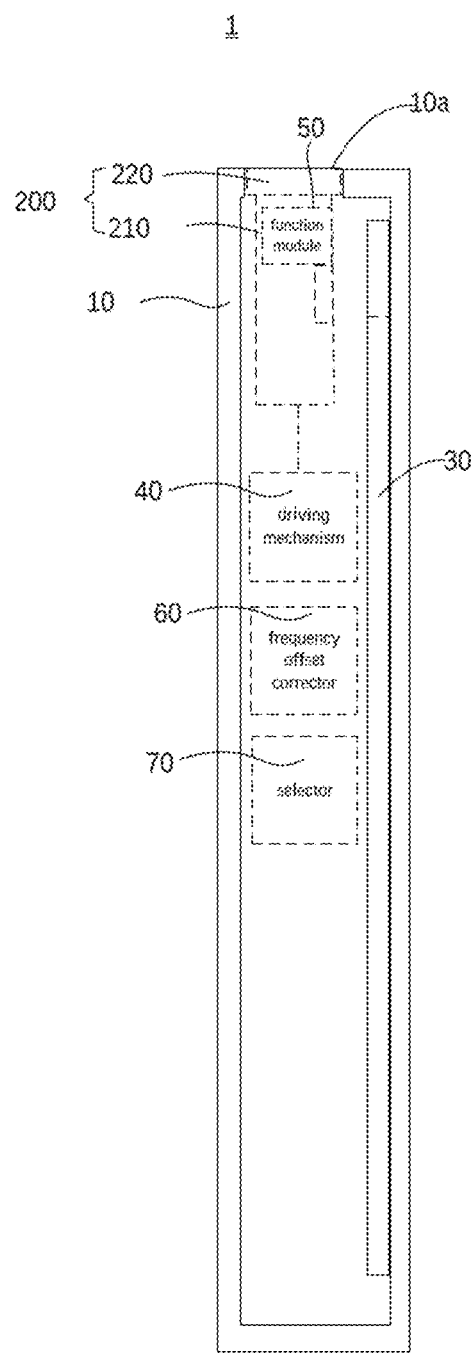
FIG. 8 is a schematic diagram of the sliding seat provided by FIG. 4 received in the receiving space.

Referring to FIGS. 6-8, FIG. 6 is a schematic diagram of the sliding seat of an electronic apparatus according to a fourth embodiment. FIG. 7 is a schematic diagram of the sliding seat provided by FIG. 4 moving out of the receiving space. FIG. 8 is a schematic diagram of the sliding seat provided by FIG. 4 received in the receiving space. In this embodiment, the sliding seat 20 can be made of a metal material or an insulating material. The sliding seat 20 may include a seat body 220 and a lid portion 210. The seat body 220 and the lid portion 210 may be connected to each other by a side face of the seat body 220 and a side face of the lid portion 210. A size of the lid portion 210 along a direction perpendicular to a removal direction of the sliding seat 20 is larger than a size of the sliding seat 20 along the direction perpendicular to a removal direction of the sliding seat 20. When the sliding seat 2 is received in the receiving space 14, a face of the lid portion 210 away from the sliding seat 20 can form part of a facade of the electronic apparatus 1. The first antenna radiator T11 and the third antenna radiator T13 may be disposed on the seat body 220.

Specifically, the lid portion 210 may include a first connection face 210a, a first surface 210b, a second surface 210c and a third surface 210d. The first connection face 210a is a face facing to the seat body 220. The first surface 210b may be located opposite to the first connection face 210a. When the sliding seat 20 is received in the receiving space 14, the first surface 210b can form part of a facade of the electronic apparatus 1. The second surface 210c may be located opposite to the third surface 210d. The second surface 210c may be connected to the first connection face 210a and the first surface 210b. The third surface 210c may be connected to the first connection face 210a and the first surface 210b. The seat body 220 may include a second connection face 220a facing to the lid portion 210. The seat body 220 may further include a fourth surface 220b and a fifth surface 220c which are located opposite to each other. The second connection face 220a may be connected to the fourth surface 220b and the fifth surface 220c. The seat body 220 and the lid portion 210 connected to each other by a side face of the seat body 220 and a side face of the lid portion 210 may mean a plane the fourth surface 220b lies in may be located between a plane the second surface 210c lies in and a plane the third surface 210d lies in, and a plane the fifth surface 220c lies in may be located between the plane the second surface 210c and the plane the third surface 210d lies in.

In this embodiment, the first antenna radiator T11 and the third antenna radiator T13 may be disposed on the seat body 220, and the seat body 220 and the lid portion 210 may be connected to each other by a side face of the seat body 220 and a side face of the lid portion 210. An inner wall of the opening 10a can have a reasonable distance to the first antenna radiator T11 and the third antenna radiator T13, which can decrease damage to antenna radiators disposed on the seat body 220, while the sliding seat 20 is moved out of or retracted into the receiving space 14. Further, since the size of the lid portion 210 along the direction perpendicular to the removal direction of the sliding seat 20 is larger than the size of the sliding seat 20 along the direction perpendicular to the removal direction of the sliding seat 20, sealing performance of the electronic apparatus 1 can be enhanced while the sliding seat 20 is received in the receiving space 14, which can reduce entrance of dust and the like into the receiving space 14.

Furthermore, the lid portion 210 may be movably connected to the seat body 220. The lid portion 210 can move in a predetermined distance relative to the seat body 220 in a plane defined by the first surface 210b of the lid portion 210. Due to assembly errors, the lid portion 210 may touch side walls of the main body 10 configured to define the opening 10a, while the sliding seat 20 is moved out of or retracted into the receiving space 14 through the opening 10a. Since the lid portion 210 can move in a predetermined distance relative to the seat body 220 in a plane defined by the first surface 210b of the lid portion 210, the lid portion 210 can not be blocked by the side walls. Thus, the sliding seat 20 can be moved out of or retracted into the receiving space 14 more smoothly.

FIGS. 1-3 illustrate an electronic apparatus of an embodiment according to the present disclosure. The electronic apparatus 1 may include a housing 10, a sliding seat 20 and a plurality of antenna 80 radiators. The housing 10 may have a receiving space 14 defined therein. Wherein an opening 10a may be formed in the housing 10 to communicate with the receiving space 14 such that the receiving space 14 can be communicated outside via the opening 10a. The sliding seat 20 may be received in the receiving space 14, and movably connected to the housing 10 such that the sliding seat 20 can have a capability of being moved out from or retracted into the receiving space 14 via the opening 10a. A plurality of antenna 80 radiators may be disposed on the sliding seat 20 and configured to be moved out from or retracted into the receiving space 14 along with the sliding seat 20.

FIGS. 1-3 illustrate an smartphone of an embodiment according to the present disclosure. The smartphone 1 may include a housing 10, a sliding seat 20 and a plurality of antenna 80 radiators. The housing 10 may have a receiving space 14 defined therein. Wherein an opening 10a may be formed in the housing 10 to communicate with the receiving space 14 such that the receiving space 14 can be communicated outside via the opening 10a. The housing 10 may include a display screen 110, a bezel 121, and a cover plate 122. The cover plate 122 may be fixed to the bezel 121. The display screen 110 and the cover plate 122 may be arranged on two opposite sides of the bezel 121 respectively. The receiving space 14 may be defined by the cover plate 122, the bezel 121 and the display screen 110. The opening 10a may be formed in the bezel 121. The sliding seat 20 may be received in the receiving space 14 and movably connected to the housing 10 such that the sliding seat 20 can have a capability of being moved out from or retracted into the receiving space 14 via the opening 10a. Wherein a plurality of antenna 80 radiators may be disposed on the sliding seat 20 and configured to be moved out from or retracted into the receiving space 14 along with the sliding seat 20.

What's more, the embodiments described above are only description of the present disclosure, and not intended to limit the scope of the present disclosure. Any equivalent structures that are made according to the specification and the attached drawings of the present disclosure, or any direct or indirect applications of the present disclosure in other related technical fields shall all be covered within the scope of the present disclosure.

What is claimed is:

1. An electronic apparatus, comprising:
a main body, having a receiving space defined therein, wherein an opening is formed in the main body to communicate with the receiving space such that the receiving space is communicated outside via the opening;
a sliding seat, received in the receiving space, and movably connected to the main body such that the sliding seat has a capability of being moved out from or retracted into the receiving space via the opening;
a middle frame, received in the receiving space;
four first antenna radiators, disposed on the middle frame and the sliding seat respectively, wherein the four first antenna radiators have a capability of operating in a first frequency band; each of the four first antenna radiators is disposed independently and spaced apart from each other; and
a frequency offset corrector, configured to correct a frequency offset caused by a position change of the antenna radiator on the sliding seat relative to the antenna radiator on the middle frame.

2. The electronic apparatus of claim 1, wherein the middle frame comprises a first portion and a second portion which are arranged to be opposite to each other, the first portion is located closer to the opening than the second portion,
one of the four first antenna radiators is disposed on the sliding seat, another of the four first antenna radiators is disposed on the first portion, and other two of the four first antenna radiators are disposed on the second portion.

3. The electronic apparatus of claim 2, wherein two of the four first antenna radiators further have a capability of operating at a second frequency band, the second frequency band comprises a low frequency band of LTE frequency band, the low frequency band of the LTE frequency band is in a range of 824 MHz~960 MHz.

4. The electronic apparatus of claim 3, wherein one of the two first antenna radiators having a capability of operating at the second frequency band is disposed on the first portion, the other one of the two first antenna radiators is disposed on the second portion.

5. The electronic apparatus of claim 1, further comprising at least two second antenna radiators disposed on the middle frame, wherein the at least two second antenna radiators has a capability of operating at a third frequency band, the third frequency band is a 5G Wi-Fi frequency band, the at least two second antenna radiators form a 2*2 MIMO 5G Wi-Fi antenna array.

6. The electronic apparatus of claim 5, wherein the middle frame comprises a first portion and a second portion which are arranged to be opposite to each other, the first portion is located closer to the opening than the second portion, the at least two second antenna radiators are disposed on the first portion.

7. The electronic apparatus of claim 5, wherein the middle frame is made of a metal material, each first antenna radiator disposed on the middle frame is an independent metal area of the middle frame separated by a slot band.

8. The electronic apparatus of claim 7, wherein one second antenna radiator disposed on the middle frame is an independent metal area of the middle frame separated by a slot band, another second antenna radiator disposed on the middle frame is a FPC (flexible printed circuit) antenna fixed on the middle frame.

9. The electronic apparatus of claim 1, further comprising a third antenna radiator disposed on the sliding seat, the third antenna radiator has a capability of operating at a fourth frequency band, the fourth frequency band comprises a 2.4G Wi-Fi frequency band.

10. The electronic apparatus of claim 9, wherein the sliding seat is made of an insulating material, the first antenna radiator and the third antenna radiator disposed on the sliding seat are FPC antennas respectively fixed on the sliding seat, or LDS (laser direct structuring) antennas respectively formed on the sliding seat by laser engraving, or PDS (printing direct structuring) antennas formed on the sliding seat by printing.

11. The electronic apparatus of claim 9, wherein the sliding seat is made of a metal material, each of the first antenna radiator and the third antenna radiator disposed on the sliding seat is an independent metal area of the sliding seat separated by slot bands.

12. The electronic apparatus of any claims of claim 1, wherein the four first antenna radiators form a 4*4 MIMO LTE antenna array, the first frequency band comprises an intermediate frequency band and a high frequency band of LTE frequency band, the intermediate frequency band of the LTE frequency band is in a range of 1710 MHZ~2170 MHZ, and the high frequency band of the LTE frequency band is in a range of 2300 MHZ~2400 MHZ and 2500 MHZ~2700 MHZ.

13. The electronic apparatus of claim 1, wherein the main body comprises:
a display screen; and
a battery cover, comprising:
a bezel; and
a cover plate fixed to the bezel;
wherein the display screen and the cover plate are arranged on two opposite sides of the bezel respectively, the receiving space is defined by the cover plate, the bezel and the display screen, the opening is formed in the bezel.

14. The electronic apparatus of claim 13, wherein the opening further passes through a part of the cover plate.

15. The electronic apparatus of claim 1, further comprising a driving mechanism configured to drive the sliding seat to be moved out from or retracted into the receiving space.

16. The electronic apparatus of claim 1, further comprising at least one function module selected from a group comprising a camera module, a flash lamp module, a position sensor module and a receiver module, and mounted on the sliding seat.

17. The electronic apparatus of claim 1, further comprising a selector configured to select a first antenna radiator disposed on the middle frame or a first antenna radiator disposed on the sliding seat to work, when the sliding seat is received in the receiving space.

18. An electronic apparatus, comprising:
a housing, having a receiving space defined therein, wherein an opening is formed in the housing to communicate with the receiving space such that the receiving space is communicated outside via the opening;
a sliding seat, received in the receiving space, and movably connected to the housing such that the sliding seat has a capability of being moved out from or retracted into the receiving space via the opening;
a plurality of antenna radiators, disposed on the sliding seat, and configured to be moved out from or retracted into the receiving space along with the sliding seat; and
a frequency offset corrector, the frequency offset corrector is configured to correct a frequency offset caused by a position change of the antenna radiator on the sliding seat relative to the antenna radiator on the middle frame.

19. A smartphone, comprising:
a housing, having a receiving space defined therein, wherein an opening is formed in the housing to communicate with the receiving space such that the receiving space is communicated outside via the opening, the housing comprises:
a display screen;
a bezel; and
a cover plate, fixed to the bezel, wherein the display screen and the cover plate are arranged on two opposite sides of the bezel respectively, the receiving space is defined by the cover plate, the bezel and the display screen, the opening is formed in the bezel;
a sliding seat, received in the receiving space, and movably connected to the housing such that the sliding seat has a capability of being moved out from or retracted into the receiving space via the opening, wherein the sliding seat comprises a seat body and a lid portion connected to each other, the lid portion is disposed at a side of the seat body away from inside of the housing, a size of the lid portion along a direction perpendicular to a removal direction of the sliding seat is larger than a size of the seat body along the direction perpendicular to a removal direction of the sliding seat;
a plurality of antenna radiators, disposed on the sliding seat, and configured to be moved out from or retracted into the receiving space along with the sliding seat; and
a frequency offset corrector, configured to correct a frequency offset caused by a position change of the antenna radiator on the sliding seat relative to the antenna radiator on the middle frame.

* * * * *